United States Patent
Brown et al.

(10) Patent No.: US 11,319,249 B2
(45) Date of Patent: May 3, 2022

(54) STRUCTURAL ASSEMBLY BOARD AND METHOD OF MANUFACTURING SAME

(71) Applicant: MgO SYSTEMS LTD., Calgary (CA)

(72) Inventors: Doug Brown, Calgary (CA); Todd McKay, Lethbridge (CA)

(73) Assignee: MGO SYSTEMS LTD., Calgary (CA)

( * ) Notice: Subject to any disclaimer, the term of this patent is extended or adjusted under 35 U.S.C. 154(b) by 0 days.

(21) Appl. No.: 16/676,075

(22) Filed: Nov. 6, 2019

(65) Prior Publication Data

US 2020/0140335 A1      May 7, 2020

Related U.S. Application Data

(60) Provisional application No. 62/756,324, filed on Nov. 6, 2018.

(51) Int. Cl.
| | | |
|---|---|---|
| *C04B 28/30* | (2006.01) | |
| *C04B 24/06* | (2006.01) | |
| *C04B 22/16* | (2006.01) | |
| *C04B 14/18* | (2006.01) | |
| *C04B 18/24* | (2006.01) | |
| *C04B 18/08* | (2006.01) | |
| *C04B 14/46* | (2006.01) | |
| *B28B 11/04* | (2006.01) | |
| *C04B 16/06* | (2006.01) | |
| *B28B 1/52* | (2006.01) | |
| *C04B 111/00* | (2006.01) | |

(52) U.S. Cl.
CPC .............. *C04B 28/30* (2013.01); *B28B 11/04* (2013.01); *C04B 14/18* (2013.01); *C04B 14/4668* (2013.01); *C04B 16/0633* (2013.01); *C04B 18/08* (2013.01); *C04B 18/248* (2013.01); *C04B 22/165* (2013.01); *C04B 24/06* (2013.01); *B28B 1/52* (2013.01); *C04B 2111/00612* (2013.01); *C04B 2201/20* (2013.01)

(58) Field of Classification Search
CPC . C04B 14/18; C04B 14/4668; C04B 16/0633; C04B 18/08; C04B 18/248; C04B 22/165; C04B 24/06; C04B 28/30; C04B 2111/00612; C04B 2201/20; B28B 1/52; B28B 11/04
See application file for complete search history.

(56) References Cited

U.S. PATENT DOCUMENTS

2019/0330113 A1\*  10/2019  Chu .................. C04B 28/30

FOREIGN PATENT DOCUMENTS

| CN | 104761279 A | * | 7/2015 |
| CN | 105218148 A | * | 1/2016 |
| CN | 106246078 A | * | 12/2016 |
| CN | 107010991 A | * | 8/2017 |
| CN | 107117930 A | * | 9/2017 |
| CN | 107140933 A | * | 9/2017 |
| CN | 107266009 A | * | 10/2017 |

\* cited by examiner

*Primary Examiner* — Anthony J Green
(74) *Attorney, Agent, or Firm* — Norton Rose Fulbright Canada LLP

(57) ABSTRACT

A composition for use in making a structural assembly board, a structural assembly made from the composition, and a method of making the structural assembly board is provided. The composition includes magnesium oxide; magnesium sulfate; and water. The composition includes reinforcing fibers. The composition and method of making the structural assembly board promote formation of $5MgO \cdot MgSO_4 \cdot 2H_2O$ to improve structural qualities of the structural assembly board.

17 Claims, 2 Drawing Sheets

STRUCTURAL ASSEMBLY BOARD AND METHOD OF MANUFACTURING SAME

FIELD

This relates to construction materials, and in particular, to structural assembly boards.

BACKGROUND

Magnesium oxide (MgO) cements are used in the construction industry as building material. Cement may be produced by the reaction between magnesium oxide, magnesium sulfate, and water to produce a cementious material.

Cements can be used as a construction material, for example in construction boards, to provide a structural insulated panel that is flame retardant, mould resistant, and recyclable.

SUMMARY

In an embodiment, a structural assembly board may be made from a composition of high-purity MgO, the composition providing properties to reduce manufacturing time, reduce curing time, and maximize structural properties of the board such as strength.

According to an aspect of the invention, a composition for use in making a structural assembly board is provided.

In an embodiment, the composition comprises magnesium oxide (MgO); magnesium sulfate; water; reinforcing fibers; and adhesive.

In another embodiment, the reinforcing fibers are at least one of basalt, polypropylene, hemp, and/or flax. The reinforcing fibers may 1-2 wt % of the composition.

In another embodiment, the adhesive is 2-4 wt % of the composition.

In another embodiment, the composition is free of fly ash.

In another embodiment, the composition comprises aggregate. The aggregate may be at least one of fly ash and perlite.

In another embodiment, the composition further comprising polycarboxylates and polyol polymers.

In another embodiment, the composition further comprises an organic acid. The organic acid may be at least one of citric acid, tartaric acid, sodium malate, adipic acid, tartaric acid and potassium tartarate.

According to another aspect, a structural assembly board made from the composition of the present invention is provided.

In an embodiment, the structural assembly board is free of mesh, e.g. structural reinforcing fiberglass mesh. In another embodiment, the structural assembly board comprises structural reinforcing mesh.

In another embodiment, the structural assembly board has a pore diameter of less than 2 mm.

In another embodiment, the structural assembly board has a density of less than or equal to 1.2 g/mL.

According to another aspect of the invention, a method of manufacturing a structural assembly board is provided.

In another embodiment, the method comprises: dissolving magnesium sulfate in water to form a brine solution; dissolving magnesium oxide in the brine solution to form a cement mixture; mixing the cement mixture with reinforcing fibers; and curing the cement mixture in a mould. The water may be about 40° C. before magnesium sulfate is dissolved into the water. The molar ratio of $MgSO_4:H_2O$ may be about 1:18-23.

In another embodiment, the cement mixture is cured with at least one conditions selected from 50-90% humidity, 20-35° C., an atmosphere enriched in $CO_2$, and curing for at least 13 days.

In another embodiment, the method further comprises adding organic acid to the solution to promote formation of phase-5 crystalline structure in the cement mixture, the organic acid being 0.1 wt % to 2.5 wt % of the cement mixture. The organic acid may be at least one of citric acid, tartaric acid, sodium malate, adipic acid, and potassium tartarate.

In another embodiment, the method further comprises adding aggregate and reinforcing fibers to the solution.

In another embodiment, the method further comprises cooling the solution to a temperature less than or equal to 35° C. before dissolving magnesium oxide in the solution. The solution may also be about 25° C. to 45° C. when the magnesium oxide is dissolved in the solution.

In another embodiment, the method further comprises mixing the cement mixture for less than 1.5 hours.

In another embodiment, the magnesium oxide has at least two different particles sizes. The magnesium oxide may have a first particle size having a surface area of about 30 $m^2/g$ and a second particle size of about 70 $m^2/g$.

In another embodiment, the method further comprises adding at least one of carboxylic functionalized amphiphilic molecules, phosphonic functionalized amphiphilic molecules, and/or polymers to the brine solution.

In another embodiment, the method further comprises adding at least one of $NaH_2PO_4$, $KH_2PO_4$, and $H_3PO_4$, sodium silicate to the solution to improve water resistance.

In another embodiment, the method further comprises coating the board in a hydrophobic film.

DETAILED DESCRIPTION

Figure 1:
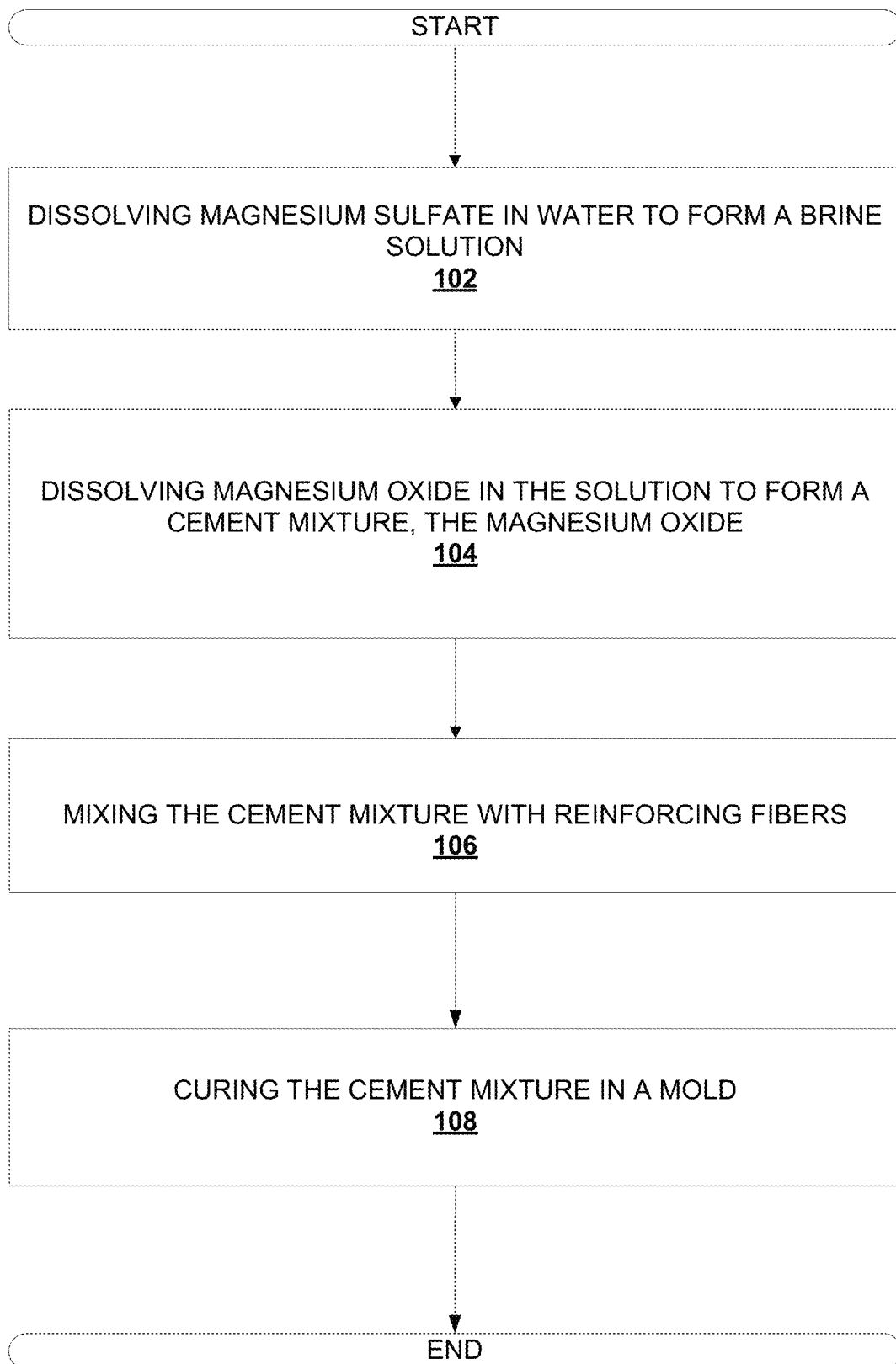
FIG. 1 depicts a method for making a structural assembly board according to some embodiments.

Cement made from magnesium oxide, magnesium sulfate, and water (i.e. $MgO:MgSO_4$ boards) may have reduced flexural strength and take longer to cure than other types of cement (e.g. assembly boards made from magnesium oxide and magnesium chloride). To provide flexural strength, prior art $MgO:MgSO_4$ boards sulfate may include fiberglass mesh to meet industry strength standards.

Structural assembly boards comprising magnesium oxide cement may be provided with improved properties, such as improved flexural strength and reduced curing time, by the formation of crystal structures such as $5MgO \cdot MgSO_4 \cdot 2H_2O$ (Phase-5 crystal structures). Increasing the amount of magnesium oxide converted into Phase-5 crystal structures, from an initial cement mixture, may improve the properties of a structural assembly board made from the composition.

Maximizing Phase-5 crystal structure in a structural assembly board made from $MgO:MgSO_4$ cement may be achieved using high purity magnesium oxide. The magnesium oxide may have multiple particle sizes. The use of high-purity magnesium oxide may improve the properties of the structural assembly board in comparison of existing $MgO:MgSO_4$ boards, for example, by increasing the strength of the board, reducing curing time, and reducing manufacturing time by reducing the number of steps required to make the structural assembly board.

Due to the limited solubility of $MgSO_4$ in aqueous solution molar ratios required for solvation of $H_2O:MgSO_4$ may be 20:1 or larger. In comparison to $MgO:MgCl_2$ cement, $MgO:MgSO_4$ cement has may be more resilient to weather due to the less hydroscopic nature of $MgSO_4$ relative to $MgCl_2$. Furthermore, the substitution of sulfate for chloride makes the cement essentially non-corrosive. $MgO:MgSO_4$ cements are typically weaker than $MgO:MgCl_2$, however the addition of metal chelating small molecules can greatly improve their strength characteristics by improving the hydration shell around the MgO particles and limiting the formation of the unwanted by-product $Mg(OH)_2$. Furthermore, inclusion of reinforcing fibers, e.g. basalt fibers, can greatly improve the flexural strength.

The composition for making a structural assembly board may also include at least one of carboxylic functionalized amphiphilic molecules, phosphonic functionalized amphiphilic molecules, and/or polymers which may be added to a composition according to the present invention. Incorporation of carboxylic or phosphonic functionalized amphiphilic small molecules or polymers in the composition to make a structural board has shown an enhancement in water resistance in the resulting board. It is postulated that the acidic anchoring group bond covalently to the metal oxychloride nanoporous structure and create a hydrophobic coating. In a further embodiment, the composition includes at least one of $NaH_2PO_4$, $KH_2PO_4$, $H_3PO_4$, and/or sodium silicate to promote water resistance of the cement formed from the composition.

In another embodiment, cellulosic fibers with polyol functionality may be added to the composition to make a structural assembly board. Cellulosic fibers with polyol functionality have also demonstrated enhanced water resistance. In a further embodiment, a structural assembly board may be coated with a thin superhydrophobic film to make the board impermeable to water.

Reinforcing fibers, specifically in inclusion of basalt fibers in a $MgO:MgSO_4$ structural assembly board of the present invention, have been demonstrated to increase flexural strength of the board. In an example, inclusion of basalt mineral fibres in an $MgO:MgSO_4$ board demonstrated a greater than 30% enhancement of the flexural strength in comparison to an $MgO:MgCl_2$ board which included imbedded fiberglass mesh on either side of the board, whereas the $MgO:MgSO_4$ board did not comprise reinforcing mesh.

In the present disclosure purity of magnesium oxide should be understood as the content of magnesium oxide in the magnesium oxide source material, e.g. a 94-98 wt % purity of MgO will have 94-98 wt % MgO with the remainder comprising oxides of at least one of calcium, iron, aluminium, and/or silicon.

In an embodiment of the present invention, a composition for use in making a structural assembly board comprises high purity magnesium oxide, magnesium sulfate, water, reinforcing fibers, and adhesive. The high purity magnesium oxide and reinforcing fibers contribute to provide an improved structural assembly board that may have increased flexural strength in comparison to typical cement boards made from magnesium oxide, magnesium sulfate, and water. In an embodiment, the purity of the magnesium oxide in the composition is 94-98 wt % MgO. In a further embodiment, the purity of the magnesium oxide in the composition may be greater than 96.5 wt % MgO.

The magnesium oxide may have at least two different particles sizes, for example, MgO(30) and MgO(40) from Baymag™. In an embodiment, the MgO may comprise a first particle size of about 30 $m^2/g$ and a second particle size of about 70 $m^2/g$, for example, MgO(30) and MgO(40) from Baymag™. MgO(30) may have a particle distribution where 90 vol % is less than 65 μm. MgO(40) may have a particle distribution where 90 vol % is less than about 36 μm. During the reaction between MgO, $MgSO_4$ and water, the desirable product of the reaction is a Phase-5 Crystal Structure; however, a competing reaction may convert MgO and water into magnesium hydroxide which may cause cured cement to become brittle. Smaller MgO particles, e.g. 30 $m^2/g$, are more reactive than larger MgO particles, yet if reacted alone with $MgCl_2$ and water will promote formation of magnesium hydroxide. Larger MgO particles, e.g. 70 $m^2/g$, if reacted alone with $MgCl_2$ and water, are less reactive than a small particle and tend to favour Phase-5 crystal structure formation; however, the center of the particle may become non-reactive. A combination of small and larger particle sizes may promote a reaction rate that favours the formation of Phase-5 crystal structure. Typical mixtures of large to small particles are 3:1 by weight and demonstrate substantial Phase-5 crystal growth. The magnesium sulfate used in the reaction may be $MgSO_4.7H_2O$ which is Epsom salt and can be purchased from Univar™ with a greater than 95% purity.

In the present disclosure, the composition for use in making a structural assembly board does not contain chloride. The absence of chloride may reduce corrosivity of the structural assembly board by as much at 500% in comparison to cement boards made from magnesium oxide, magnesium chloride, and water.

Traditional $MgO:MgSO_4$ cement boards are generally reinforced by reinforcing mesh, e.g. fiberglass mesh, to provide a supporting structure for the cement board so that it does not fracture when flexed. In an embodiment of the present invention, flexural strength of an structural assembly board may be improved by adding reinforcing fiber to the composition for making a structural assembly board. In an further embodiment, the fiber may be at least one of basalt, polypropylene, hemp, and/or flax.

In another embodiment, aggregate, for example fly ash (type F) and/or perlite, may be added to lower the density of the composition and increase flexural strength of a structural assembly board made from the composition.

In an embodiment, the structural assembly board made from the composition of the present invention is free of mesh (e.g. fiberglass mesh). The absence of mesh greatly simplifies manufacturing. However, reinforcing mesh may be added to a structural assembly boards made from the composition according to the present invention, for example to provide a hurricane rated structural assembly board.

Two particle sizes of perlite have been investigated as part of the composition for making a structural assembly board. In an embodiment, the two sizes of perlite may be added as 10-15% wt of the composition for making a structural assembly board. For example, the particle size may be 0.5 mm-2 mm, and the density of perlite may be Perlite C (coarse) and Perlite F (fine). Alternative perlite particle sizes and densities may be used in the composition.

As discussed above, typical $MgO:MgSO_4$ cement boards tend be inherently weaker than $MgO:MgCl_2$ cement board as they have reduced flexural strength. In an embodiment, the small quantities of organic acids, e.g. 0.1 wt % to 2.5 wt % of the composition, may be added to promote the formation of the Phase-5 crystalline structure. In an embodiment, citric acid, tartaric acid, and sodium malate have may accomplish the desired affect by retarding the reaction rate between $MgO:MgSO_4$ to promote Phase-5 crystalline structure formation. In another embodiment, adipic acid and/or potassium tartarate have demonstrated stronger enhancement then that of citric acid, tartaric acid and sodium malate. The exact mechanism of the enhancement is likely due to chelation of MgO or retarding the hydration reaction of MgO:MgSO$_4$.

In an embodiment, potassium bitartrate may be is used to slow down the hydration of MgO and limit the side reaction from producing the by-product Mg(OH)$_2$. In another embodiment, citric acid may also bed used to slow down the hydration of MgO and limit the side reaction from producing the by-product Mg(OH)$_2$.

Sodium phosphate (NaH$_2$PO$_4$) may also be used in the composition to improve water resistance to maintain strength characteristics when a structural assembly board is submerged in water. Similarly polycarboxylates and polyol polymers improves flexural strength as well as improves water resistance by lowering water absorption and permeation. In an example, polycarboxylates and polyol polymers be 1-5 wt % of the composition.

In an embodiment, polymer p-1460 is a polyacrylate polymer used to produce boards that are more resistant to water and imbue elasticity to the board. Improved elasticity allows a structural assembly board to be resilient to puncture, e.g. by an air powered nail. For example, the composition of Example 3, is able to receive an air powered nail within 30 days of curing without fracturing.

Exemplary compositions for use in making a structural assembly board are shown in Examples 1-3

Example 1

| Component | wt % | Ratio |
| --- | --- | --- |
| MgO (30) | 10-40 | 2.5-10 |
| MgO (40) | 10-40 | 2.5-10 |
| MgSO$_4$•7H$_2$O | 20-30 | 1.00 |
| H$_2$O | 23-31 | |
| Tartrate | 0-1.1 | |
| NaH$_2$PO$_4$ | 0-5 | |
| Perlite (F) | 8-11 | |
| Flax | 2.5-5 | |
| Fly Ash | 8-15 | |

Example 2

| Component | wt % | Ratio |
| --- | --- | --- |
| MgO (30) | 10-40 | 2.5-10 |
| MgO (40) | 10-40 | 2.5-10 |
| MgSO$_4$•7H$_2$O | 20-30 | 1.00 |
| H$_2$O | 23-31 | |
| Basalt Fiber | 0.25-2 | |
| Perlite (F) | 8-11 | |
| Flax | 2.5-5 | |
| Citric Acid | 0.1-1 | |

Example 3

| Component | wt % | Ratio |
| --- | --- | --- |
| MgO (30) | 10-35 | 2.5-10 |
| MgO (40) | 10-35 | 2.5-10 |
| MgSO$_4$•7H$_2$O | 20-30 | 1.00 |
| H$_2$O | 23-31 | |
| Basalt Fiber | 0.25-2 | |
| Perlite (F) | 8-11 | |
| Wood Flour | 2.5-5 | |
| Citric Acid | 0.1-1 | |
| Polymer p-1460 | 1-3 | |

Controlling formation of Phase-5 crystal structure when making a structural assembly board is important to provide the board with improved properties, e.g. flexural strength.

With reference to the method flow chart of FIG. 1, some embodiments may provide for a method of manufacturing a structural assembly board.

At 102, a brine solution may be produced by dissolving magnesium sulfate, in a warmed solution of water (e.g. ~40° C.). Due to the limited solubility of magnesium sulfate, the mole ratio of H$_2$O:MgSO$_4$ may be 20:1 or larger. In an embodiment, the mole ratio of MgSO$_4$:H$_2$O of the composition is maintained at about 1:18-23. The brine solution may then be cooled (e.g. to less than ~35° C.) and checked for absolute clarity before addition of remaining components.

At 104, high purity MgO having a purity of 94-98 wt % MgO is dissolved in the brine solution to form a cement mixture. In an embodiment, the purity of MgO is greater than or equal to 96.5 wt % MgO. The magnesium oxide may have at least two different particles sizes, for example, a first particle size having a surface areas equal to 30 m$^2$/g and a second particle size having a surface area equal to 70 m$^2$/g. The mixture of the two particle sizes imbues an ability to control the reaction rate of the initial crystallization of the cement. Smaller particles react more quickly than larger particles, however, the use of small particles alone can cause rapid curing, formation of magnesium hydroxide, and weakening issues in the cement product if not controlled precisely. Larger particles are less reactive and tend to convert MgO into stronger crystalline structures; however, the center of the particle may become non-reactive leaving gaps in said crystalline structures. A mixture of at least two particle sizes may optimize Phase-5 crystal formation.

Reinforcing fibers are added to the composition to augment the strength of the concrete. In an embodiment, aggregate may also be added to increase strength and reduce density of the concrete. The aggregate (e.g. perlite and fly ash) and/or reinforcing fibers (e.g. basalt, polypropylene, hemp and/or flax) may be added by monitoring the temperature of cement mixture to determine when aggregate and reinforcing fibers is added. The magnesium oxide may be dissolved in the brine solution at about 25° C. to 45° C. The dissolution of MgO into the brine solution is preferably accomplished at low temperature, e.g. less than 35° C., to avoid the formation of the higher activation energy product Mg(OH)$_2$. The aggregate and reinforcing fibers serve to augment the strength of structural assembly board such that the board will may not require supplementary structural support (e.g. fiberglass mesh). At least one of carboxylic functionalized amphiphilic molecules, phosphonic functionalized amphiphilic molecules, and/or polymers may also be added to the solution to promote flexural strength of a structural assembly board. In a further embodiment, at least one of NaH$_2$PO$_4$, KH$_2$PO$_4$, H$_3$PO$_4$, and sodium silicate are also added to the solution to improve water resistance of a structural assembly board. Accordingly, in an embodiment, a structural assembly board may be free of supplementary structural support such as fiberglass mesh.

At 106, the cement mixture is mixed to provide a homogenous mixture. In an embodiment, a high shear or low shear mixing process provides a workable homogeneous after approximately 15 minute of mixing time. In an embodiment, mixing should not exceed 1.5 hours to avoid crystallization in turbulent conditions.

At 108, the cement mixture is cured. In an embodiment, the cement mixture is moulded and then vibrated to remove trapped air before curing. In another embodiment, curing may occur under high humidity (50-90%) and temperature (20-35° C.) conditions to improve strength of the cement. The board may then be cured for at least 13 days and then demoulded. In another embodiment, the cement mixture may be placed an in enriched $CO_2$ environment to increase the rate at which the cement is cured.

According to some embodiments, a structural assembly board may be made from a composition for use in making a structural assembly board described above. The structural assembly board may have a Phase-5 crystal structure composition comprising more than 80% of the MgO in the composition. In another embodiment, the Phase-5 crystal structure composition of the board comprises greater than 90% of the MgO in the composition. In a further embodiment, water resistance of the board may be augmented by coating the board in a hydrophobic film. Fiberglass mesh may also be impregnated into the board to augments strength, e.g. for hurricane rated boards.

Figure 2:
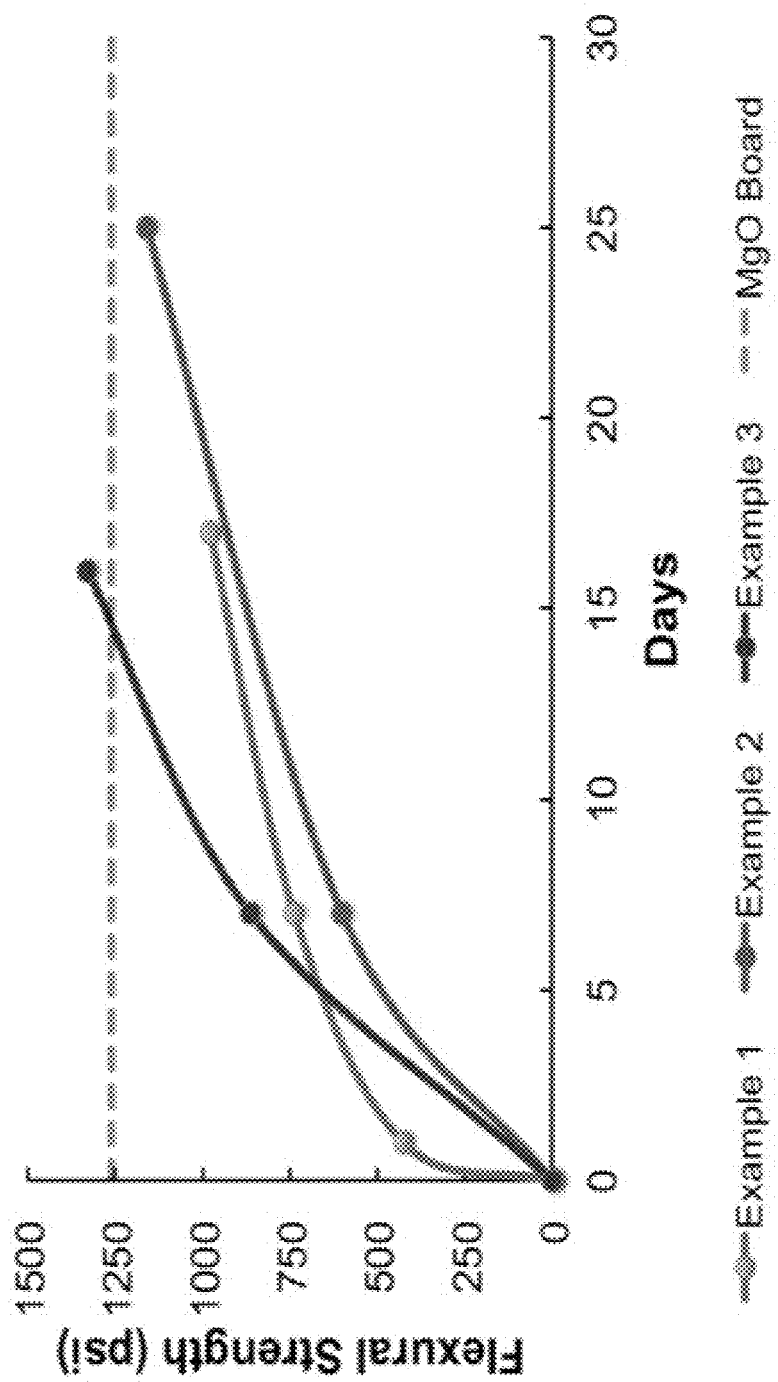
FIG. 2 is a graphical illustration of flexural strength according to embodiments of the invention.

Structural properties of MgO concrete (e.g. flexural strength) increase over time as long as the concrete is not exposed to harsh environments. However, MgO concrete made according to embodiments of the above method may be cured to a commercially acceptable flexural strength within at least 15 days. Further, as shown in FIG. 2, the flexural strength of a commercially available magnesium oxide board (which does not contain magnesium sulfate), which has been cured for at least 1 year, is compared to the structural assembly boards produced from the compositions of Examples 1-3, over a measured period of curing time in air at room temperature. As shown in FIG. 2, the structural assembly board made from the composition of Examples 1-3, provide similar flexural strength to the commercially available magnesium oxide board within 30 days of curing.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the detailed embodiments described above and illustrated are intended to be examples only. The invention is defined by the appended claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A composition for use in making a structural assembly board comprising:
   Magnesium oxide;
   Magnesium sulfate;
   water;
   reinforcing fibers;
   adhesive;
   organic acid being 0.1 wt % to 2.5 wt % of the composition; and
   aggregate, wherein the aggregate is at least one of fly ash and perlite.

2. The composition of claim 1, wherein the reinforcing fibers are at least one of basalt, polypropylene, hemp, and/or flax.

3. The composition of claim 1, wherein the reinforcing fibers are 1-2 wt % of the composition.

4. The composition of claim 1, further comprising polycarboxylates and polyol polymers.

5. The composition of claim 1, wherein the organic acid comprises at least one of citric acid, tartaric acid, sodium malate, adipic acid, and potassium tartrate.

6. A structural assembly board made from the composition of claim 1.

7. A method of manufacturing a structural assembly board, the method comprising:
   dissolving magnesium sulfate in water to form a brine solution;
   dissolving magnesium oxide in the brine solution to form a cement mixture;
   mixing the cement mixture with reinforcing fibers;
   curing the cement mixture in a mould; and
   dissolving organic acid into the solution to promote formation of phase-5 crystalline structure in the cement mixture, the organic acid being 0.1 wt % to 2.5 wt % of the cement mixture.

8. The method of claim 7, wherein the cement mixture is cured with at least one conditions selected from 50-90% humidity, 20-35° C., an atmosphere enriched in $CO_2$, and a curing time of at least 13 days.

9. The method of claim 7, wherein the water is about 40° C. before magnesium sulfate is dissolved into the water.

10. The method of claim 7, wherein a molar ratio of $MgSO_4:H_2O$ is 1:18-23.

11. The method of claim 7, further comprising adding aggregate and reinforcing fibers to the solution.

12. The method of claim 7, further comprising cooling the solution to a temperature less than or equal to 35° C. before dissolving magnesium oxide in the solution.

13. The method of claim 12, wherein the solution is at about 25° C. to 45° C. when the magnesium oxide is dissolved in the solution.

14. The method of claim 7, wherein the magnesium sulfate comprises magnesium sulfate particles having at least two different surface areas.

15. The method of claim 14, wherein the magnesium sulfate particles comprises a first magnesium sulfate particle having a surface area of about 30 $m^2/g$ and a second magnesium sulfate particle having a surface area of about 70 $m^2/g$.

16. The method of claim 7, further comprising adding at least one of carboxylic functionalized amphiphilic molecules, phosphonic functionalized amphiphilic molecules, and/or polymers.

17. The method of claim 7, wherein the organic acid is at least one of citric acid, tartaric acid, sodium malate, adipic acid, and potassium tartrate.

* * * * *